W. SHOEMAKER.
NEST TRAP.
APPLICATION FILED NOV. 16, 1916.

1,251,431.

Patented Dec. 25, 1917.
2 SHEETS—SHEET 1.

Inventor
Wm. Shoemaker

By John Louis Waters
Attorney

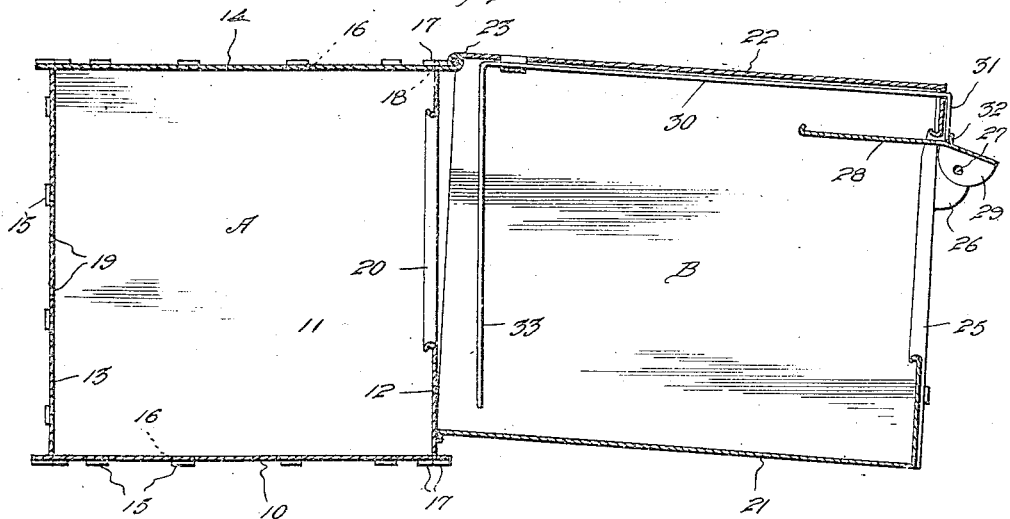
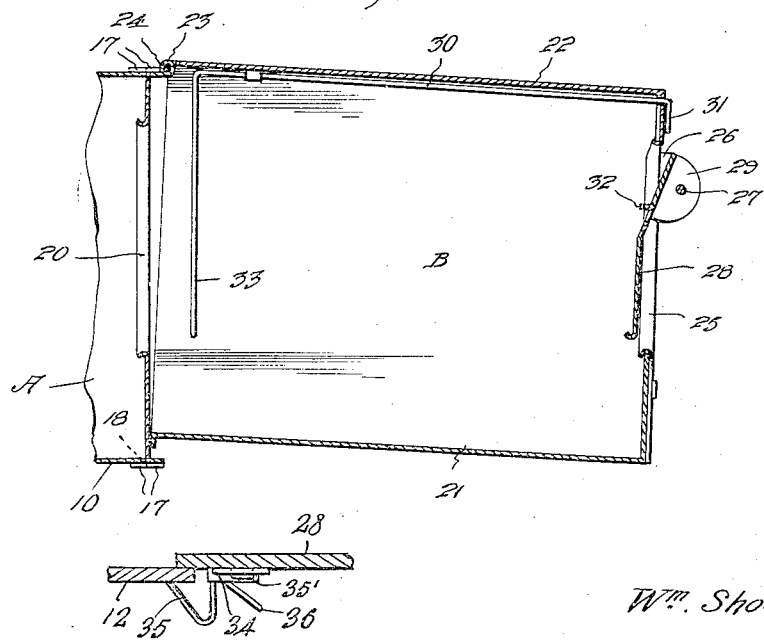

UNITED STATES PATENT OFFICE.

WILLIAM SHOEMAKER, OF ALLIANCE, NEBRASKA.

NEST-TRAP.

1,251,431. Specification of Letters Patent. Patented Dec. 25, 1917.

Application filed November 16, 1916. Serial No. 131,760.

*To all whom it may concern:*

Be it known that I, WILLIAM SHOEMAKER, a citizen of the United States, residing at Alliance, in the county of Box Butte and State of Nebraska, have invented certain useful Improvements in Nest-Traps, of which the following is a specification, reference being had therein to the accompanying drawing.

The invention relates to poultry nests, and more particularly to the class of trap nests for use in poultry yards.

The primary object of the invention is the provision of a nest of this character wherein a fowl, when entering the nest will be automatically trapped, so as to prevent the fowl from leaving the nest or gaining freedom therefrom.

Another object of the invention is the provision of a nest of this character wherein the trap thereof is provided with a swinging trap door, which is latched in open position, the latch being operated by the fowl when entering the nest, so that the door will automatically close, and thereby trap the fowl within the nest, so that the fowl cannot gain freedom or leave the nest, the trap door being readily and easily set for trapping purposes.

A further object of the invention is the provision of a trap nest of this character wherein the nest and the trap constructions are of novel form, and are connected together so that the same can be readily separated from each other or the trap swung in open position for gaining access to the nest or the trap, thereby enabling the cleaning of both the nest and the trap should the occasion require, for sanitary purposes.

A still further object of the invention is the provision of a trap nest of this character wherein the door, when closed, is automatically locked, so that there is no possibility of a fowl gaining freedom through the doorway when said door is closed.

A still further object of the invention is the provision of a trap nest of this character which is extremely simple in construction, thoroughly reliable and efficient in operation, strong, durable, and inexpensive in manufacture.

With these and other objects in view, the invention consists in the features of construction, combination, and arrangement of parts, as will be hereinafter fully described, illustrated in the accompanying drawings, and pointed out in the claim hereunto appended.

In the accompanying drawings:—

Fig. 3 is a vertical longitudinal sectional view through the trap nest, showing the trap door in open latched position.

Fig. 4 is a view similar to Fig. 3, showing the door closed and

Fig. 5 is a plan view of the spring latch 34, partly in section.

Similar reference characters indicate corresponding parts throughout the several views in the drawings.

Figure 1:
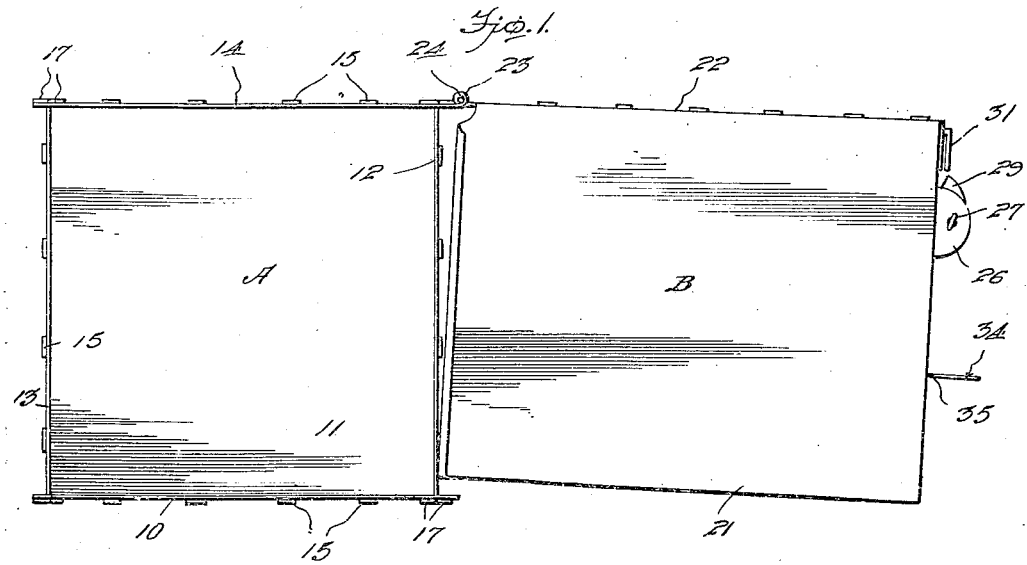
Figure 1 is a side elevation of a trap nest constructed in accordance with the invention.
Figure 2:
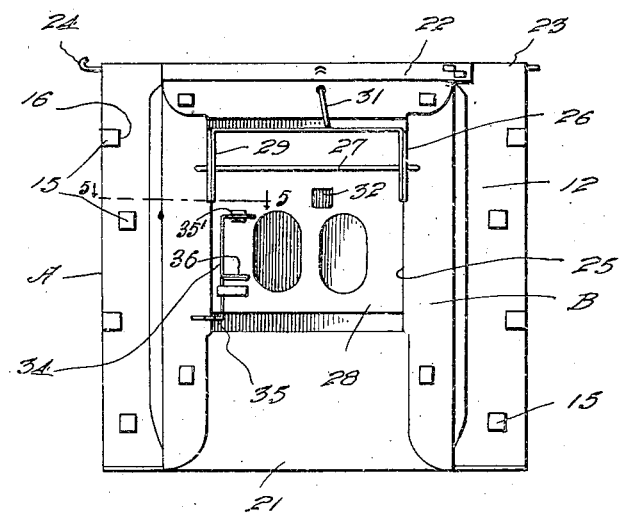
Fig. 2 is a front elevation thereof.

Referring to the drawings in detail, A designates generally the nest box, and B the trap body, the details of which will be hereinafter fully described.

The nest box A comprises a bottom 10, side walls 11, front wall 12, back wall 13, and a top 14, each being preferably made from sheet metal, the side walls 11, at their marginal edges being formed with spaced bendable ears 15, which are passed through slots 16 formed in the bottom 10, front wall 12, back wall 13, and top 14, and are turned on themselves, and likewise, the front and back walls 12 and 13 are provided at their top and bottom edges with spaced bendable ears 17, which pass through slots 18, formed in the bottom 10 and top 14, and are bent upon themselves so that in this manner the ears 15 and 17 fasten the walls top and bottom of the box A together to provide a unitary structure.

The back wall 13 is formed with a series of holes 19, which permit ventilation of the nest box A, while the front wall 12 is formed with a window or entrance opening 20 for establishing communication between the trap body B and the said nest box.

The trap body B is preferably made from a single piece of sheet metal, bent to form the right-angular shaped or box-like housing 21, which is open at its inner end for communication thereof with the nest box A through the window or entrance opening 20, formed in the front wall of the latter.

The top 14 of the nest box A and the top 22 of the housing 21, constituting the trap body B, are formed with pintle or pivot sleeves 23 for detachably receiving a pivot pin 24, passed therethrough, and in this manner, the trap body B can be readily swung relative to the nest box A, and also said trap body can be detached from the nest box should the occasion require.

The front or outer end of the housing 21 is formed with a doorway or entrance opening 25, through which fowls enter the trap body B, as will be apparent.

Mounted in pivot ears 26, formed at the front end of the housing 21, near the top of the doorway or entrance opening 25, is a pivot 27 for swingingly supporting a gravity closing trap door 28, which is also formed with pivot ears 29 receiving the pivot 27 and this door 28 is adapted to gravitate from normal open position to closed position, the door being held in normal open position through the medium of a trap latch hereinafter described.

Swingingly mounted upon the top 22 at the inner side thereof of the housing 21 is a trip latch rod 30, the forward end of which is formed with a hook latch terminal 31, which is adapted to engage a keeper 32, cut and stamped upwardly from the door 28, so as to hold the latter in normal open position, while the other end of the latch rod 30 is formed with a right angular trip arm 33, which depends from the top 22 of the housing 21 therein into the path of the course of a fowl after entering the trap body B, and on going into the nest box A through the entrance opening or window 20, so that the fowl will displace the arm 33, and thereby move the latch terminal 31 of said latch rod 30 out of engagement with the keeper 32 on the door 28 for the freeing of the latter, which by its own weight, will gravitate to closed position, and thereby trapping the fowl for nesting purposes.

Mounted upon the door 28 is a spring wire latch 34, which has a latch nose 35, for automatic locking engagement with one edge of the doorway 25 when the door swings to closed position, thereby locking the door closed, to prevent any possibility of the fowl leaving the nest box A through the trap body B, yet the door can be released by manually manipulating the latch 34, to reset the said door for trapping purposes. By taking hold of the handle 36 and raising the same the upper curved portion of the latch may be released from the bracket 35' which is open at its upper end. This will permit the latch 34 to be rotated so as to move the nose 35 out of engagement with the door, after which the latch is slid down and the upper portion is placed in the bracket 35'.

When it is desired to gain access to the nest box A, the trap body B can be swung upwardly and downwardly onto the body of said nest box A, thereby giving free access to the nest box for removing the fowl therefrom, or for cleaning the said box to render the same sanitary.

Also, access can be had to the trap body B when in resting position for any purpose desired. It will be noted that the lower portion of the door is wide enough to engage the opposite edges of the opening so that pressure applied against this door will tend to keep the door closed while the upper portion of the door is inclined with respect to the other portion and is made of such a width as to permit the door to swing between the edges of the opening, and when the door is closed, as shown in Fig. 4, the upper inclined portion has a portion projecting outside the openings. Therefore the keeper 32 is inside of the receptacle, as it should be.

From the foregoing, it is thought that the construction and manner of use of the invention will be clearly understood, and therefore, a more extended explanation has been omitted.

What is claimed is:

In a device of the class described, in combination, a box, a pair of spaced apart forwardly projecting ears mounted thereupon, said box being formed with an opening on one side, a trap door consisting of a lower portion adapted to overlap the opposite edges of said opening and an upper portion inclined forwardly from the lower portion and adapted to freely move between the edges of the opening, a pair of right angular ears integrally formed upon the upper inclined portion of said trap door, a pivot rod mounted upon both sides of ears so as to pivotally position said trap door, an integral keeper formed upon the upper portion of said door and adapted to move outside of the opening into a substantially parallel position with respect to the adjacent wall of the box, a trip latch rod projecting over the front wall of the box and having a right angular hook terminally projecting in back of said keeper to hold said door in open position, and a downwardly extending right angular trip arm formed at the back end of said trip rod and having a swinging movement to disengage said hook terminally from the keeper.

In testimony whereof I affix my signature.

WILLIAM SHOEMAKER.